Patented Dec. 18, 1923.

1,477,938

UNITED STATES PATENT OFFICE.

REGINALD PERCY LEOPOLD BRITTON, OF LONDON, ENGLAND, ASSIGNOR TO GRIFFITHS BROS. & COMPANY LONDON LIMITED, OF LONDON, ENGLAND, A BRITISH LIMITED LIABILITY COMPANY.

FLUID COMPOSITION FOR COMPOUNDING, IMPREGNATING, AND COATING.

No Drawing. Application filed August 24, 1922. Serial No. 584,140.

*To all whom it may concern:*

Be it known that I, REGINALD PERCY LEOPOLD BRITTON, a subject of the King of England, residing at Wimbledon Park, London, England, have invented certain new and useful Improvements in Fluid Compositions for Compounding, Impregnating, and Coating, of which the following is a specification.

I have found that silicic acid in the form of an irreversible colloidal solution may be advantageously applied to the treatment of solids for compounding with or coating the same, and in particular is adaptable with advantage to the impregnation or coating for preservative and decorative purposes of fibrous or porous substances, such as wood, brickwork, concrete, cement or the like. The colloid being irreversible, on passage from the sol to the gel state (for instance, by dehydration) there results a deposition upon the material treated with the solution of an amorphous, water-insoluble substance which is resistant to atmospheric influence, and to the action of common acids and most of the usual solvents.

According to the present invention, therefore, there is used as a composition for coating, impregnation, compounding and like purposes, or as a medium for colour, an irreversible alkaline silico-sol.

The sol may be silicic acid peptised in a solution of alkali or of an alkaline silicate.

The sol may be prepared by any desired method, such for instance, as follows:—

(a) The addition of acid to a soluble silicate in such manner as to precipitate the silicic acid in gelatinous or granular form, the precipitate being purified by washing and filtering, say in a bag-press, and then peptised by grinding with a small quantity of an alkaline solution.

(b) The hydration of sand or silica by grinding, and/or heating, with water, followed by peptisation of the hydrated product by grinding with alkali.

(c) The peptisation, for instance, by grinding, of silica or diatomaceous-earth in solutions of water-glass, with or without separation of the unpeptised material which may act as an adsorbent for the caustic alkali produced by hydrolysis.

One preferred form of colloidal silicic acid for use according to this invention consists of a sol having substantially 90 per cent of free silica, $SiO_2$, calculated on the dry material.

This sol of high silica content may be prepared in the following way:—

Silicic acid is precipitated from a soluble silicate, or commercial water-glass solution, by the addition of an acid such as hydrochloric or sulphuric acid, and the precipitate is washed and rapidly filtered in a bag-press. The precipitate is then brought into solution by grinding in an alkaline solution, the alkali content of which is maintained sufficiently low to give an irreversible colloidal solution, so that when dry the silicic acid will be insoluble in water and in contact therewith will not undergo repeptisation.

In utilizing the sol for the production of a paint, a mineral pigment, such, for example, as lead chromate, lead sulphate or lithopone, or a suitable organic colouring matter, is compounded with the colloidal solution in the requisite relative quantities to give a paint of the desired consistency. Prepared with mineral pigments, such paints are applicable for articles liable to be exposed to high temperatures, and these paints are protective to combustible materials such as wood, fabric and the like. Such paints are also applicable as washable distempers or wall finishes. Likewise the sol may be used as a component of an enamel or as a varnish or lacquer or constituent thereof.

Porous concrete vessels, such, for example, as tanks treated with the sol are rendered proof against the action of petrol, oil and the like. The solution may also be used as a dressing for cemented surfaces, asbestos boards, and other surfaces liable to shredding or rubbing.

Compounded with suitable fillers such as cork-dust the sol may be used for floor-dressing, and to provide substitutes for linoleum. By compounding with asbestos powder, or other appropriate disintegrated material, with or without colouring matters, so as to form a paste, a product is obtained suitable for cementing articles together or for moulding objects. Colloidal silicic acid sol is also particularly suitable for the treatment of fire furnaces, electrical resistances and as an acid-resistant cement.

I claim:—

1. The process which comprises bringing an irreversible alkaline silico-sol into contact with a solid and depositing silica from the sol in an insoluble form upon the substance of the solid.

2. The process which comprises bringing an irreversible alkaline silico-sol into contact with a porous solid and depositing silica from the sol in an insoluble form upon the substance of the solid.

3. The process which comprises bringing an irreversible alkaline silico-sol into contact with a solid in a disintegrated state and depositing silica from the sol in an insoluble form upon the substance of the solid.

4. The process which comprises bringing an irreversible alkaline silico-sol into contact with a solid surface and depositing silica in an insoluble form upon the surface.

5. The process which comprises coating a solid body with an irreversible alkaline silicic acid sol compounded with a solid pigment and then effecting deposition of the pigment and of silica from the sol in an insoluble form upon the solid.

6. The process which comprises bringing an irreversible alkaline silicic acid sol into contact with a solid and effecting the deposition of insoluble silica upon the substance of the solid by the action of heat.

7. The process which comprises bringing an irreversible alkaline silicic acid sol having a content in free silica of substantially 90%, calculated on the dry material, into contact with a solid and depositing silica from the sol in an insoluble form upon the substance of the solid.

8. A composition of matter comprising an irreversible alkaline silico-sol and a compounding material.

9. A composition of matter comprising an irreversible alkaline silicic acid sol and a compounding material in the form of a disintegrated solid.

10. A composition of matter comprising an irreversible alkaline silicic acid sol and a compounding material in the form of a disintegrated colour giving solid.

11. A composition of matter comprising an irreversible alkaline silicic acid sol and a compounding material in the form of a disintegrated mineral pigment.

12. A composition of matter comprising an irreversible alkaline silicic acid sol and a compounding material in the form of a disintegrated solid resistant to heat.

In testimony whereof I affix my signature.

REGINALD PERCY LEOPOLD BRITTON.